United States Patent
Kim (10) Patent No.: US 10,343,659 B2
(45) Date of Patent: Jul. 9, 2019

(54) ELECTRIC BRAKE SYSTEM AND METHOD THEREOF

(71) Applicant: MANDO CORPORATION, Pyeongtaek-si, Gyeonggi-do (KR)

(72) Inventor: Seokjong Kim, Hwaseong-si (KR)

(73) Assignee: MANDO CORPORATION, Pyeongtaek-si, Gyeonggi-do (KR)

(*) Notice: Subject to any disclaimer, the term of this patent is extended or adjusted under 35 U.S.C. 154(b) by 0 days.

(21) Appl. No.: 15/730,280

(22) Filed: Oct. 11, 2017

(65) Prior Publication Data

US 2018/0099649 A1 Apr. 12, 2018

(30) Foreign Application Priority Data

Oct. 11, 2016 (KR) .................. 10-2016-0131491

(51) Int. Cl.
- *B60T 8/172* (2006.01)
- *B60T 13/66* (2006.01)
- *B60T 13/68* (2006.01)
- *B60T 13/74* (2006.01)

(52) U.S. Cl.
CPC ............ B60T 8/172 (2013.01); B60T 13/662 (2013.01); B60T 13/686 (2013.01); B60T 13/745 (2013.01); *B60T 2201/03* (2013.01); *B60T 2220/04* (2013.01)

(58) Field of Classification Search
CPC ...... B60T 8/172; B60T 13/662; B60T 13/686; B60T 13/745; B60T 2201/03; B60T 2220/04

USPC .................................................. 303/122.11
See application file for complete search history.

(56) References Cited

U.S. PATENT DOCUMENTS

| | | | |
|---|---|---|---|
| 5,186,524 A * | 2/1993 | Burgdorf | B60T 8/38 303/10 |
| 5,219,442 A * | 6/1993 | Burgdorf | B60T 8/38 303/113.3 |
| 8,668,279 B2 * | 3/2014 | Van Deventer | B60T 13/74 303/126 |
| 9,409,555 B2 * | 8/2016 | Yamamoto | B60T 7/12 |
| 9,802,592 B2 * | 10/2017 | Okano | B60T 8/34 |
| 9,994,202 B2 * | 6/2018 | Epple | B60T 13/12 |
| 10,053,078 B2 * | 8/2018 | Duff | B60T 17/221 |

(Continued)

FOREIGN PATENT DOCUMENTS

| | | | |
|---|---|---|---|
| JP | 2004161174 A | * | 6/2004 |
| KR | 2002-0052541 A | | 7/2002 |
| KR | 10-2013-0045084 A | | 5/2013 |

*Primary Examiner* — Thomas W Irvin
(74) *Attorney, Agent, or Firm* — Hauptman Ham, LLP (57) ABSTRACT

Disclosed are an electric brake system and a control method thereof. The electric brake system with a hydraulic control device configured to generate a hydraulic pressure using a piston which is operated by an electrical signal that is output in response to a displacement of a brake pedal, the electric brake system including a pedal stroke sensor portion configured to measure a movement distance of the brake pedal and a variation of the movement distance; and a controller configured to determine an initial braking intent from a driver on the basis of the measured movement distance of the brake pedal and the measured variation of the movement distance, and perform initial braking control when the initial braking intent from the driver is determined.

4 Claims, 4 Drawing Sheets

(56) References Cited

U.S. PATENT DOCUMENTS

2015/0343905 A1* 12/2015 Knechtges .............. B60T 7/042
  303/3
2018/0134261 A1* 5/2018 Akita ...................... B60T 7/042

* cited by examiner

ELECTRIC BRAKE SYSTEM AND METHOD THEREOF

This application claims the benefit of Korean Patent Application No. 10-2016-0131491, filed on Oct. 11, 2016 in the Korean Intellectual Property Office, the disclosure of which is incorporated herein by reference.

BACKGROUND

1. Field

Embodiments of the present disclosure relate to an electric brake system, and more particularly, to an electric brake system and a control method thereof which are capable of determining a braking intent from a driver in advance and generating a braking pressure in advance, thereby improving braking performance.

2. Description of the Related Art

A brake system for braking is necessarily mounted on a vehicle, and a variety of systems for providing stronger and more stable braking have been proposed recently.

For example, there are brake systems including an antilock brake system (ABS) for preventing a wheel from sliding while braking, a brake traction control system (BTCS) for preventing a driving wheel from slipping when a vehicle is suddenly unintendedly accelerated or intentionally accelerated, an electronic stability control (ESC) system for stably maintaining a driving state of a vehicle by combining an ABS with traction control to control a hydraulic pressure of a brake, and the like.

Generally, an electric brake system includes a hydraulic pressure supply device which receives a braking intent from a driver in a form of an electrical signal from a pedal stroke sensor which senses a displacement of a brake pedal when the driver steps on the brake pedal and then supplies a hydraulic pressure to a wheel cylinder.

The hydraulic pressure supply device is configured such that a motor operates according to a pedal effort of a brake pedal to generate a braking pressure. At this point, the braking pressure is generated by converting a rotational force of the motor into a rectilinear movement to pressurize a piston.

Specifically, when a hydraulic pressure is generated by the motor, an amount of fluid may be adjusted using a characteristic of required fluid amount that is a constant relationship established between a braking pressure, which is generated in a caliper by adjusting a position of a piston inside a chamber mounted on a wheel through the motor, and an amount of fluid flowing into the caliper, thereby controlling the braking pressure.

Specifically, a curve of required fluid amount is used to calculate a variation $\Delta P$ of a hydraulic pressure generated according to a volume variation $\Delta V$ of an amount of fluid flowing into the caliper, thereby calculating a braking pressure generated in the caliper.

However, there is a problem in that the caliper of a brake has a dead pressure section according to the characteristic of required fluid amount, and braking response performance is deteriorated due to the dead pressure section such that a braking intent from a driver is not reflected.

SUMMARY

Therefore, it is an aspect of the present disclosure to improve deterioration of braking control performance, which is caused by an execution delay of braking control since a braking intent from a driver is not reflected.

Also, it is another aspect of the present disclosure to improve a phenomenon in which a braking intent from a driver is not reflected due to a dead pressure section caused by a characteristic of required fluid amount of a caliper of a brake.

Additional aspects of the disclosure will be set forth in part in the description which follows and, in part, will be obvious from the description, or may be learned by practice of the disclosure.

According to one aspect of the present disclosure, there may be provided an electric brake system with a hydraulic control device configured to generate a hydraulic pressure using a piston which is operated by an electrical signal that is output in response to a displacement of a brake pedal, the electric brake system including a pedal stroke sensor portion configured to measure a movement distance of the brake pedal and a variation of the movement distance; and a controller configured to determine an initial braking intent from a driver on the basis of the measured movement distance of the brake pedal and the measured variation of the movement distance, and perform initial braking control when the initial braking intent from the driver is determined.

Also, the hydraulic control device may include a master cylinder configured to generate a hydraulic pressure in response to the displacement of the brake pedal; a hydraulic pressure circuit configured to deliver the hydraulic pressure, which is generated in the master cylinder, to at least one wheel; a motor configured to operate the hydraulic pressure circuit; and a cut valve disposed between the master cylinder and the hydraulic pressure circuit and configured to control a flow of oil.

Also, when the measured movement distance of the brake pedal exceeds a first preset threshold value and the measured variation of the movement distance exceeds a second preset threshold value, the controller may determine as the initial braking intent from the driver.

Also, when the measured movement distance of the brake pedal exceeds a third threshold value that is greater than the first preset threshold value, the controller may perform braking control according to a curve of required fluid amount.

Also, when a preset time passes while the initial braking control is performed, the controller may release the initial braking control.

According to another aspect of the present disclosure, there may be provided a control method of an electric brake system which is provided with a hydraulic control device configured to generate a hydraulic pressure using a piston which is operated by an electrical signal that is output in response to a displacement of a brake pedal, the control method including measuring a movement distance of the brake pedal and a variation of the movement distance; determining an initial braking intent from a driver on the basis of the measured movement distance of the brake pedal and the measured variation of the movement distance; and performing initial braking control when the initial braking intent is determined.

Also, the hydraulic control device may include a master cylinder configured to generate a hydraulic pressure in response to the displacement of the brake pedal; a hydraulic pressure circuit configured to deliver the hydraulic pressure, which is generated in the master cylinder, to at least one wheel; a motor configured to operate the hydraulic pressure circuit; and a cut valve disposed between the master cylinder and the hydraulic pressure circuit and configured to control a flow of oil.

Also, when the measured movement distance of the brake pedal exceeds a first preset threshold value and the measured variation of the movement distance exceeds a second preset threshold value, the initial braking intent may be determined.

Also, the performing of the initial braking control when the initial braking intent is determined may include performing braking control according to a curve of required fluid amount when the measured movement distance of the brake pedal exceeds a third threshold value that is greater than the first preset threshold value.

Also, the performing of the initial braking control when the initial braking intent is determined may release the initial braking control when a preset time passes while the initial braking control is performed.

DETAILED DESCRIPTION

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein and may be implemented in other forms. In the drawings, some portions not related to the description will be omitted and will not be shown in order to clearly describe the present disclosure, and also a size of a component may be somewhat exaggerated to help understanding.

Figure 1:
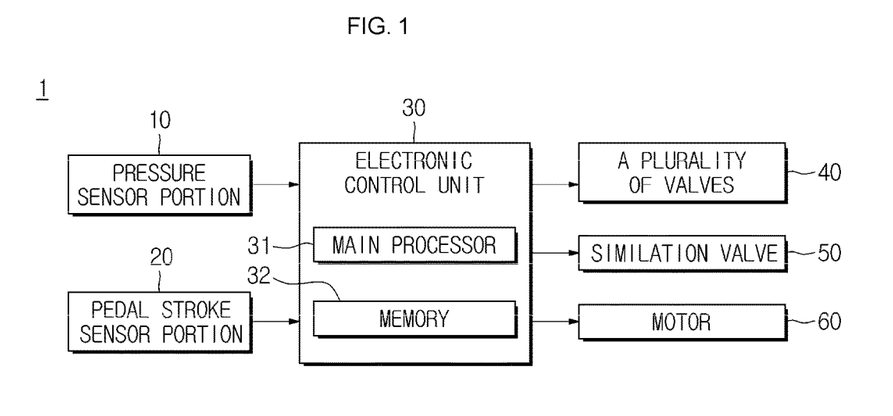
FIG. 1 is a schematic block diagram of an electric brake system of a vehicle according to one embodiment of the present disclosure.
Figure 2:
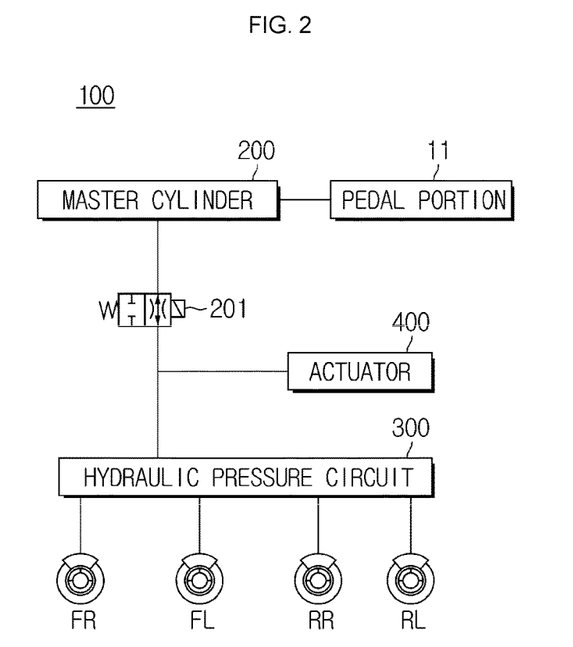
FIG. 2 is a block diagram schematically illustrating a configuration of a hydraulic control device which is controlled by the electric brake system of the vehicle according to one embodiment of the present disclosure.

FIG. 1 is a schematic block diagram of an electric brake system of a vehicle according to one embodiment of the present disclosure, and FIG. 2 is a block diagram schematically illustrating a configuration of a hydraulic control device which is controlled by the electric brake system of the vehicle according to one embodiment of the present disclosure.

Referring to FIG. 1, an electric brake system 1 of a vehicle includes a pressure sensor portion 10 configured to sense a hydraulic pressure in a hydraulic pressure device, a pedal stroke sensor portion 20 configured to sense a braking intent from a driver, an electronic control unit 30 configured to perform braking control, and a plurality of valves 40, a simulation valve 50, and a motor 60 which are driven according to a control signal that is calculated in the electronic control unit 30 and are provided in a hydraulic pressure circuit.

The pressure sensor portion 10 includes a plurality of pressure sensors. Specifically, a pressure value of each of wheels FR, FL, RR, and RL may be measured through a pressure sensor (not shown) included in each of the wheels FR, FL, RR, and RL, and the measured pressure value may be transmitted to the electronic control unit 30.

Next, the pedal stroke sensor portion 20 includes a pedal stroke sensor (not shown).

Specifically, the pedal stroke sensor is configured to detect an amount for which a driver manipulates a brake pedal 2, and may convert an output voltage into a depth at which the brake pedal 2 is stepped on, that is, a stroke.

Accordingly, a braking intent from the driver may be determined through a movement distance of a pedal stroke, which is the depth at which the driver steps on the brake pedal 2, and a variation of the movement distance of the pedal stroke on the basis of the output voltage.

The pedal stroke sensor may be configured to output a pair of True/False signals, a pair of Positive/Negative signals, and the like, or a single signal.

Next, the electronic control unit 30 collectively controls the electric brake system 1 of the vehicle according to the present disclosure.

Specifically, the electronic control unit 30 includes a main processor 31 configured to sense the braking intent from the driver and an amount of braking from the pedal stroke sensor portion 20 and calculate a braking pressure corresponding to a requested braking pressure of the driver in advance; and a memory 32 configured to store various data.

Accordingly, the main processor 31 of the electronic control unit 30 may control a master cylinder 200, a hydraulic pressure circuit 300, an actuator 400, and a cut valve 201 which are included in a hydraulic control device 100 shown in FIG. 2, the plurality of valves 40 included in the hydraulic pressure circuit 300, and each of the wheels FR, FL, RR, and RL connected to the hydraulic pressure circuit 300.

Specifically, FIG. 2 is a block diagram schematically illustrating a configuration of the hydraulic control device 100 which is controlled by the electric brake system 1 of the vehicle according to one embodiment of the present disclosure.

First, the master cylinder 200 included in the hydraulic control device 100 generates a hydraulic pressure, a reservoir configured to store oil is connected above the master cylinder 200, and an input rod (not shown) pressurizes the master cylinder 200 according to a pedal effort of the brake pedal 2 included in a pedal portion 11 such that the hydraulic pressure is generated in the master cylinder 200.

The pedal stroke sensor, which is included in the pedal stroke sensor portion 20 of FIG. 1, is mounted on the pedal portion 11.

The pedal portion 11 may include the input rod and may pressurize a first piston (not shown) included in the master cylinder 200.

That is, the master cylinder 200 may be configured to include at least one chamber to generate a hydraulic pressure according to a movement of the first piston pressurized by the input rod.

As one example, the master cylinder 200 may be configured to include two chambers, a first piston and a second piston may be respectively provided at the two chambers, and a hydraulic pressure may be discharged from each of the two chambers to be delivered to the hydraulic pressure circuit 300.

Meanwhile, the master cylinder 200 may include the two chambers to secure safety when one chamber fails. For example, one of the two chambers may be connected to a front right wheel FR and a rear left wheel RL of a vehicle, and the remaining chamber may be connected to a front left wheel FL and a rear right wheel RR thereof. As described above, the two chambers may be independently configured such that braking of the vehicle may be possible even when one of the two chambers fails.

Next, the hydraulic pressure circuit 300 includes the plurality of valves 40 and the simulation valve 50, and may open and close the plurality of valves 40 included in the hydraulic pressure circuit 300 according to a control signal received from the electronic control unit 30 to adjust a hydraulic pressure delivered to each wheel.

The cut valve 201 is disposed between the master cylinder 200 and the hydraulic pressure circuit 300 and controls delivery of a hydraulic pressure to the hydraulic pressure circuit 300.

The actuator 400 includes the motor 60, and the motor 60 may pump and supply brake fluid to each wheel cylinder.

The hydraulic control device 100 may operate according to a control signal generated by the main processor 31 in the electronic control unit 30.

Specifically, the electronic control unit 30 collectively controls the electric brake system 1 of the vehicle according to the present disclosure.

In the electric brake system 1 according to the present disclosure, when a braking intent from a driver is sensed by the pedal stroke sensor portion 20, the electronic control unit 30 may perform initial braking control corresponding to the braking intent from the driver even immediately before braking control is performed.

Figure 3:
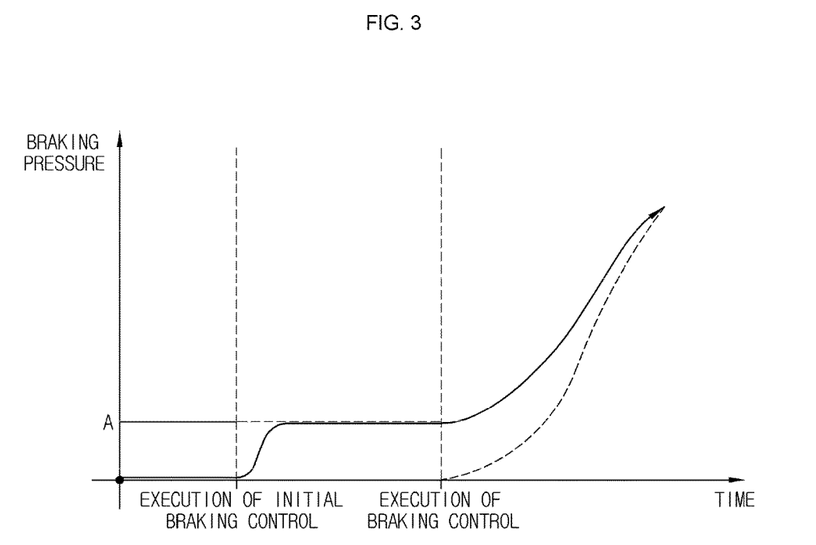
FIG. 3 is a graph illustrating a control method of the electric brake system of the vehicle according to one embodiment of the present disclosure.

Specifically, as shown in FIG. 3, a thick solid line is a graph illustrating a curve of a braking pressure according to a condition in a control method of the electric brake system 1 according to the present disclosure, and a dotted line is a graph illustrating conventional braking control.

First, in the electric brake system 1 according to the present disclosure, the main processor 31 determines whether a condition corresponds to an initial braking control condition on the basis of a movement distance of a pedal stroke and a variation thereof which are sensed by the pedal stroke sensor portion 20.

Also, in the electric brake system 1 according to the present disclosure, the main processor 31 determines whether a circuit pressure is close to 0 bar on the basis of a pressure sensed by the pressure sensor (not shown) included in the hydraulic pressure circuit 300.

That is, the electronic control unit 30 compares the sensed movement distance of the pedal stroke with a first threshold value, and the variation of the pedal stroke with a second threshold value to execute the initial braking control.

Specifically, when the movement distance of the pedal stroke is greater than the first threshold value and the variation of the pedal stroke is greater than the second threshold value, the electronic control unit 30 determines that a condition of the initial braking control is satisfied and raises a braking pressure to a preset pressure of A bar.

At this point, the initial braking control refers that braking control is performed in advance to minimize a pedal dead stroke section caused by a characteristic of a caliper by determining the braking intent from the driver in advance on the basis of the movement distance of the pedal stroke and the variation thereof.

At this point, the preset pressure of A bar in the main processor 31 may be provided as a pressure value with a magnitude by which a certain level of a pressure not causing drag of the vehicle is provided in advance to be able to improve braking responsiveness of the driver.

That is, when execution of the initial braking control is determined, the electronic control unit 30 operates and controls the motor 60 to pump and supply the brake fluid to each wheel cylinder, thereby maintaining the braking pressure at A bar while the initial braking control is executed.

Thereafter, the main processor 31 determines whether the braking control is executed. Specifically, the braking control refers that a definite braking intent from the driver is determined as in a case in which a movement distance of the pedal stroke, which is greater than the first threshold value used to determine the execution of the initial braking control, is sensed.

That is, for example, when a movement distance of the pedal stroke, which is greater than a preset third threshold value that is a threshold value greater than the first threshold value, is sensed, the main processor 31 may determine that the driver intends to execute the braking control.

Accordingly, when execution of the braking control is determined, the main processor 31 releases the initial braking control and executes the braking control. At this point, the execution of the braking control refers that a variation $\Delta P$ of a hydraulic pressure, which is generated according to a volume variation $\Delta V$ of brake fluid flowing into the caliper according to the characteristic of required fluid amount, is calculated and a braking pressure generated in the caliper is calculated, thereby performing the braking control.

Next, the memory 32 may include a volatile memory, such as a static random access memory (S-RAM), a dynamic random access memory (D-RAM), and the like, as well as a nonvolatile memory, such as a flash memory, a read only memory (ROM), an erasable programmable read only memory (EPROM), an electrically erasable programmable read only memory (EEPROM), and the like.

The nonvolatile memory may semipermanently store control program and control data for controlling the operation of the electric brake system 1, and the volatile memory may temporarily retrieve the control program and the control data from the nonvolatile memory and may temporarily store various sensor information and various control signals output from the main processor 31.

Hereinbefore, the configuration of the electric brake system 1 according to the present disclosure has been described.

Figure 4:
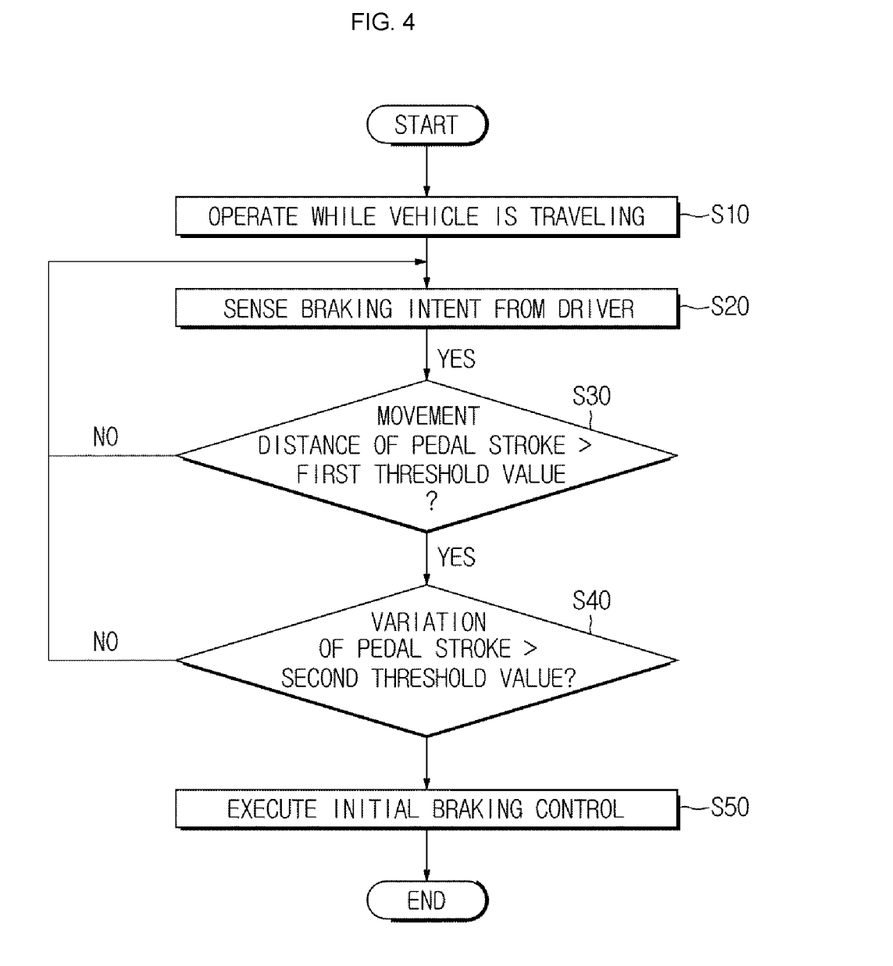
FIG. 4 is a flowchart illustrating the control method of the electric brake system of the vehicle according to one embodiment of the present disclosure.
Figure 5:
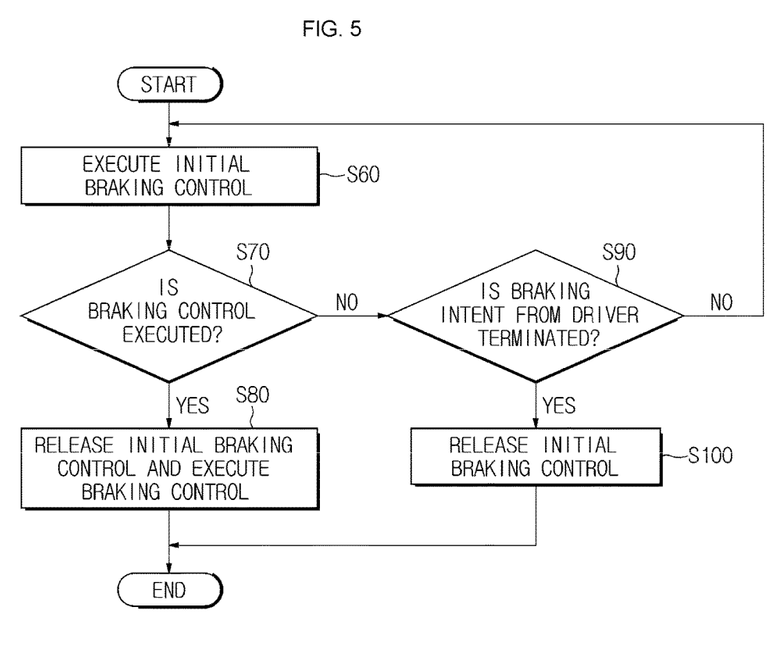
FIG. 5 is a flowchart illustrating a control method of the electric brake system of the vehicle according to another embodiment of the present disclosure.

FIGS. 4 and 5 are each flowcharts of a control method of the electric brake system 1 according to the present disclosure.

Specifically, FIG. 4 is a flowchart illustrating execution of an initial braking control according to the control method of the electric brake system of the vehicle according to one embodiment of the present disclosure, and FIG. 5 is a flowchart illustrating release of the initial braking control according to the control method of the electric brake system of the vehicle according to one embodiment of the present disclosure.

First, the electric brake system 1 according to the present disclosure is provided to improve braking responsiveness of a driver, and operates while the vehicle is traveling (S10). Specifically, although not shown in the drawing that the vehicle is traveling, it may be determined that a signal is detected by a wheel speed sensor.

Next, a braking intent from the driver is sensed (S20). Specifically, the braking intent from the driver may be determined through the pedal stroke sensor (not shown) included in the pedal stroke sensor portion 20 of the electric brake system 1. That is, the pedal stroke sensor is configured to detect an amount for which the driver manipulates the brake pedal 2, and may convert an output voltage into a depth at which the brake pedal 2 is stepped on, that is, a stroke, thereby sensing the braking intent from the driver and an amount of braking.

As shown in FIG. 4, in order to execute the initial braking control (S50), the movement distance of the pedal stroke is compared with the first threshold value, and the variation of the pedal stroke is compared with the second threshold value (S30 and S40).

Specifically, when the movement distance of the pedal stroke is greater than the first threshold value (YES in S30) and the variation of the pedal stroke is greater than the second threshold value (YES in S40), the electronic control unit 30 executes the initial braking control (S50).

At this point, the first threshold value is a preset value for measuring the depth at which the driver steps on the brake pedal 2, which is sensed by the pedal stroke sensor, and may be set to a value that is less than a threshold value for starting the braking control according to the braking intent from the driver.

Also, the second threshold value is a preset value for measuring the depth at which the driver steps on the brake pedal 2 for a unit time as being compared with the variation of the pedal stroke, and may be set to determine a momentary braking intent from the driver.

Accordingly, when the execution of the initial braking control is determined, the electronic control unit 30 of the electric brake system 1 according to the present disclosure operates and controls the motor 60 to pump and supply the brake fluid to each wheel cylinder.

At this point, using a hydraulic pressure that is secured by pumping the brake fluid to each wheel cylinder, the electronic control unit 30 may generate a braking pressure, which will be generated in the caliper, in advance by adjusting a position of the piston inside the chamber mounted on each wheel through the motor 60.

Next, after the execution of the initial braking control (S60), the control method of the electric brake system 1 according to the present disclosure will be described with reference to FIG. 4.

First, after the execution of the initial braking control, the electric brake system 1 determines whether braking control is executed (S70). Specifically, the braking control refers that the definite braking intent from the driver is determined (S70) as in a case in which the movement distance of the pedal stroke, which is greater than the first threshold value used to determine the execution of the initial braking control, is sensed.

That is, for example, when the movement distance of the pedal stroke, which is greater than a third preset threshold value that is a threshold value greater than the first threshold value, is sensed, the electric control unit 30 may determine that the driver intends to execute the braking control.

Accordingly, when the execution of the braking control is determined (YES in S70), the electric control unit 30 releases the initial braking control and executes the braking control (S80). At this point, the execution of the braking control refers that a variation ΔP of a hydraulic pressure, which is generated according to a volume variation ΔV of brake fluid flowing into the caliper according to the characteristic of required fluid amount, is calculated and a braking pressure generated in the caliper is calculated, thereby performing the braking control.

When the electronic control unit 30 does not determine as the execution of the braking control (NO in S70), the electric brake system 1 according to the present disclosure detects whether the braking intent from the driver is terminated (S90). Specifically, in order to determine whether the braking intent from the driver is terminated, when the movement distance of the pedal stroke, which is less than the third preset threshold value that is a threshold value greater than the first threshold value, is sensed and a predetermined time passes, the electronic control unit 30 may determine that the braking intent from the driver is terminated.

Accordingly, when the braking intent from the driver is determined to be terminated (YES in S90), the electric brake system 1 releases the initial braking control (S100). That is, the releasing of the initial braking control refers that the plurality of valves 40 and the like, which are included in the hydraulic pressure circuit 300, are controlled to release the hydraulic pressure generated in each wheel brake.

As should apparent from the above description, the electric brake system and the control method thereof according to one embodiment of the present disclosure are capable of improving deterioration of braking control performance, which is caused by an execution delay of braking control since a braking intent from a driver is not reflected.

Also, the electric brake system and the control method thereof according to one embodiment of the present disclosure are capable of improving a phenomenon in which a braking intent from a driver is not reflected due to a dead pressure section caused by a characteristic of required fluid amount of a caliper of a brake.

Although the present disclosure has been described above by way of specific embodiments and the accompanying drawings, the present disclosure is not limited thereto, it should be understood that numerous modified embodiments can be devised by those skilled in the art without departing from the gist defined by the appended claims, and such modified embodiments should not be individually understood from the present disclosure.

What is claimed is:

1. An electric brake system comprising:
   a master cylinder in which a hydraulic pressure is generated in response to a displacement of a brake pedal;
   an actuator configured to generate the hydraulic pressure using a piston which is operated by an electrical signal that is output in response to the displacement of the brake pedal;
   a hydraulic pressure circuit configured to deliver the hydraulic pressure, which is generated by the actuator, to at least one wheel;
   a cut valve disposed between the master cylinder and the hydraulic pressure circuit and configured to control a flow of oil;
   a pedal stroke sensor portion configured to measure a movement distance of the brake pedal and a variation of the movement distance; and
   a controller configured to determine an initial braking intent from a driver on the basis of the measured movement distance of the brake pedal and the measured variation of the movement distance, and perform initial braking control when the initial braking intent from the driver is determined,
   wherein, when the measured movement distance of the brake pedal exceeds a first preset threshold value, the controller determines as the initial braking intent from the driver,
   wherein, when the measured variation of the movement distance exceeds a second preset threshold value, the controller determines as the initial braking intent from the driver, wherein, when the measured movement distance of the brake pedal exceeds a third threshold value that is greater than the first preset threshold value, the controller performs braking control according to a curve of required fluid amount, and when a preset time passes while the initial braking control is performed, the controller releases the initial braking control.

2. The electric brake system of claim 1, wherein the braking control is performed according to the curve of required fluid amount on the basis of a curve of a hydraulic pressure according to a preset volume variation of the oil.

3. A control method of an electric brake system including a master cylinder in which a hydraulic pressure is generated in response to a displacement of a brake pedal; an actuator configured to generate the hydraulic pressure using a piston which is operated by an electrical signal that is output in response to the displacement of the brake pedal; a hydraulic pressure circuit configured to deliver the hydraulic pressure, which is generated by the actuator, to at least one wheel; and a cut valve disposed between the master cylinder and the hydraulic pressure circuit and configured to control a flow of oil, the control method comprising:

measuring a movement distance of the brake pedal and a variation of the movement distance;

determining an initial braking intent from a driver on the basis of the measured movement distance of the brake pedal and the measured variation of the movement distance; and performing the initial braking control when the initial braking intent is determined, wherein, when the measured movement distance of the brake pedal exceeds a first preset threshold value, the initial braking intent is determined, wherein, when the measured variation of the movement distance exceeds a second preset threshold value, the initial braking intent is determined, wherein the performing of the initial braking control when the initial braking intent is determined includes performing braking control according to a curve of required fluid amount when the measured movement distance of the brake pedal exceeds a third threshold value that is greater than the first preset threshold value, and wherein the performing of the initial braking control when the initial braking intent is determined releases the initial braking control when a preset time passes while the initial braking control is performed.

4. The method of claim 3, wherein the braking control is performed according to the curve of required fluid amount on the basis of a curve of a hydraulic pressure according to a preset volume variation of the oil.

* * * * *